June 5, 1934. G. GRINDROD Re. 19,193
STERILIZATION OF FOOD PRODUCTS
Original Filed Aug. 28, 1924 2 Sheets-Sheet 1
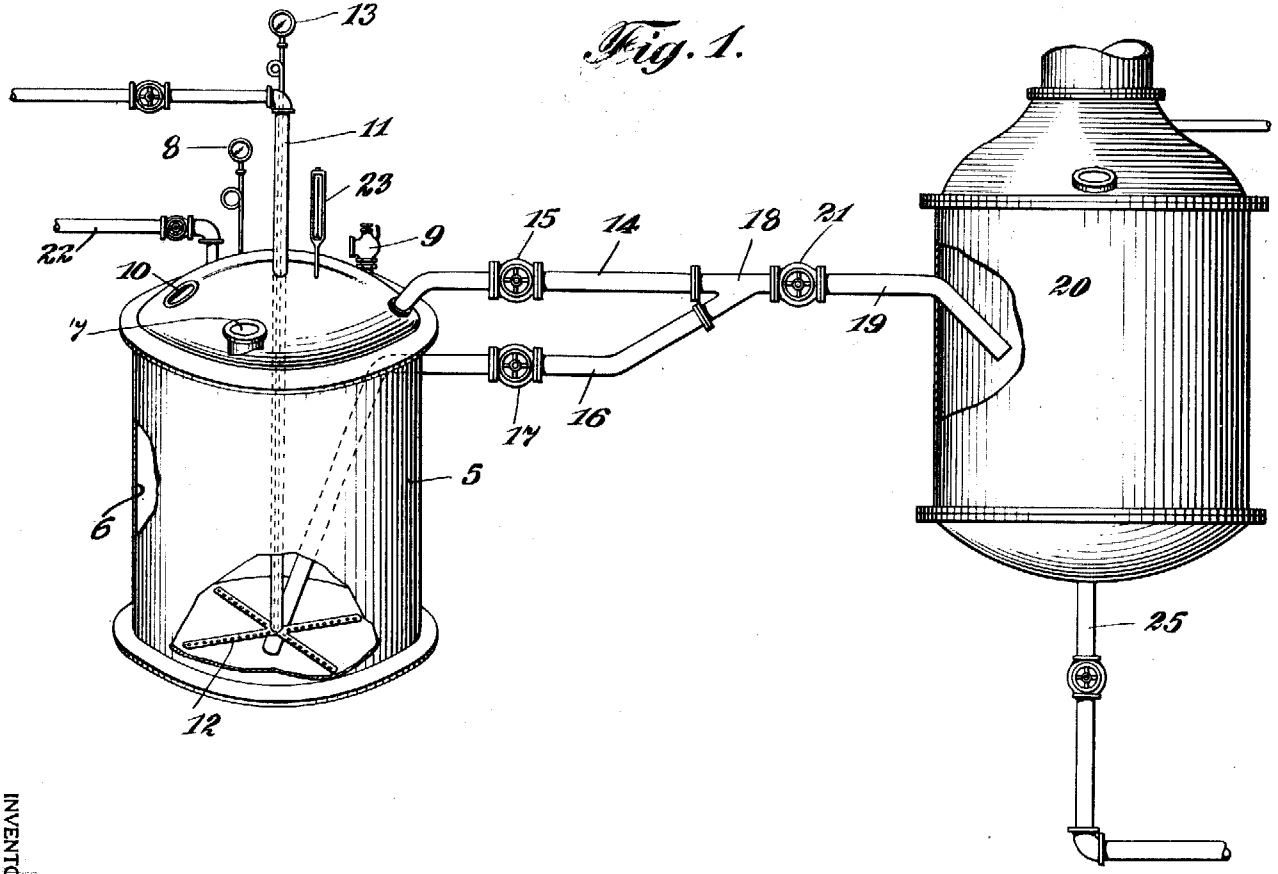
INVENTOR
George Grindrod
BY
C. P. Goepel
his ATTORNEY June 5, 1934.
G. GRINDROD
Re. 19,193
STERILIZATION OF FOOD PRODUCTS
Original Filed Aug. 28, 1924 2 Sheets-Sheet 2
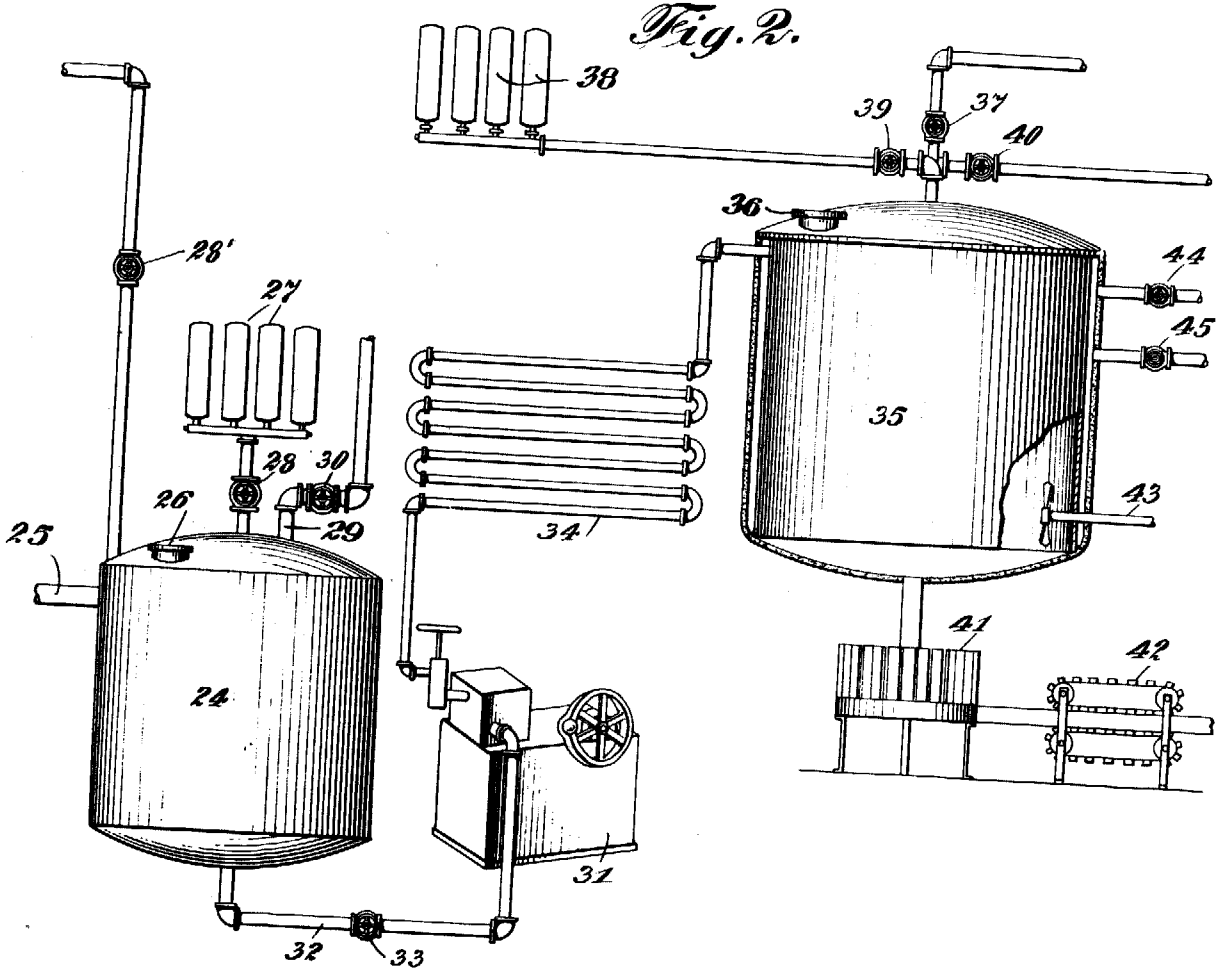
INVENTOR
George Grindrod
BY
C. P. Zepel
his ATTORNEY Reissued June 5, 1934 Re. 19,193

UNITED STATES PATENT OFFICE 19,193

STERILIZATION OF FOOD PRODUCTS

George Grindrod, Oconomowoc, Wis., assignor to Grindrod Process Corporation, Waukesha, Wis., a corporation of Wisconsin Original No. 1,714,597, dated May 28, 1929, Serial No. 734,566, August 28, 1924. Application for reissue May 23, 1931, Serial No. 539,595

21 Claims. (Cl. 99—15)

This invention relates to the sterilization of food products and more particularly, to an improved process for sterilizing food products of liquid form, such for instance as milk to be vended in cans or like containers, whereby the product is caused to keep indefinitely in an edible condition and is not deleteriously affected by alteration of its color, solubility, taste or flavor, or chemical decomposition, such as invariably results in the use of present sterilization methods or processes.

The present application is in part a continuation of my pending application for patent filed December 22, 1920, Serial No. 432,407, the present disclosure embodying as one of its fundamental features the subject matter of said application. While the invention of this prior application was to a certain extent successfully practiced, it was found in subsequently applying the process in factory scale production, that certain essential conditions while inherent in such process were not at that time fully recognized. With a view to producing uniformly successful results in large scale operations, further investigation and experiment was undertaken which resulted in disclosing heretofore unknown or unrecognized natural laws having a definite and vital relation to effective sterilization and the preservation of satisfactory color and taste in the product. At the present time, such results are being obtained in factory scale production.

The process which I shall hereinafter describe may be most aptly termed the "high temperature forewarming process". This process has been successfully applied in the production of several different kinds of sterilized milk products and constitutes the fundamental or basic feature of the present invention. Several modifications thereof and accessory processes will be hereinafter described.

The experimental data obtained during the discovery of the invention led me to believe that this invention involves heretofore unknown natural laws and requires certain radical departures from prior art practices in the sterilization of foods. The inventor believes that a discussion of the principles involved will help one skilled in the art to successfully apply the invention.

Heretofore the sterilization of canned foods has invariably been carried out after sealing the cans or containers in which the product is to be stored and sold. This is true of all products which have been completely sterilized but does not apply to non-sterile products preserved by sugar or other preservative agents. All truly perishable products such as milk, whole and evaporated, and most foods containing much protein have been sterilized only after sealing in the container. In the following description, the word "sterilization" is to be understood as meaning complete sterilization, and not partial sterilization, pasteurization, or preservation.

In general, it may be stated that heating a food to a temperature of 212° F. for ten minutes kills the moulds, yeast and all vegetative bacteria, leaving alive only the spores of certain rod shaped bacteria. The spores of the rod shaped bacteria—bacilli—are the only forms of life so far as known which are capable of living in the product after boiling. They are the organisms which have heretofore interfered with the packaging of such foods in cans with a complete assurance that the contents would remain practically indefinitely in an edible condition or without serious chemical decomposition. Most of these spores are killed in milk by heating the milk in the can under pressure for about 20 minutes at a temperature of 240° F. It is said that the same spores in canned corn are killed only after being subject to such temperature for about two hours. I have found a few very highly resistant organisms in milk which are killed or destroyed only after being subject to a temperature of 240° F. for about 35 minutes or to 242° F. for about 26 minutes.

The practical art of to-day relating to the sterilization of milk and similar food products is without knowledge as to any method or process whereby spore protoplasm can be destroyed without at the same time exerting a similar destructive effect on the inanimate compounds of the products, such as casein and lactose in milk. This destructive effect is distinctly shown by a marked change in flavor. It is a generally recognized fact that heretofore it has been impossible to render milk in the cans sterile by the heating process alone, without at the same time causing the product to acquire a cooked taste and a darkened color. In my application filed October 16, 1918, Serial No. 258,486, I describe a process for the direct sterilization of evaporated milk without the production of such a cooked taste, but this is only after a partial dialysis of the milk which removes certain flavor producing constituents. On the other hand, it is the object and purpose of my present invention to provide a process which destroys all spore protoplasm, and which produces a product substantially free from cooked taste. More particularly, my present invention has among other objects thereof, the provision of a process for sterilizing milk and other liquid foods which will not produce any appreciable or noticeable change in taste or flavor, and which may be so applied and controlled as to effect complete sterilization of such products as milk, cream, fruit juices and the like, without danger of coagulation or other injurious change in chemical composition, such as has heretofore been attendant in attempts to utilize known methods for the purpose of producing such complete sterility in the product.

It is my opinion that the above objects have been accomplished through an understanding of certain theories (which I believe were heretofore unrecognized) and through the utilization of certain fundamental differences which, I believe, exist between animate and inanimate constituents in the product being treated. An explanation of my understanding of these theories which my experiments and those of others have led me to formulate, may be briefly stated as follows:

1. Tests which I have carried out lead me to believe that the amount of heat required, in terms of time and temperature, to kill an organism of certain resistance, is lessened or decreased if the material is diluted with water, all other conditions being constant. In other words, the time required at a given temperature or the temperature required with a given time or period of heating varies directly as the percentage of water present in the solution, all other conditions, including hydrogen ion concentration, residual acidity and buffers, being constant. Why spores should die more readily in the presence of much water has not as yet been definitely ascertained. However, as a result of my extended investigations on this subject, I may offer the following possible explanation.

It is the opinion of the inventor that bacterial spores such as will grow in milk do not become internally diluted. This may be because the cells of such organisms maintain a fixed density of constituents. If this is true it may be laid down as a general rule that the effect of heat or light in destroying organic compounds such as are contained in milk is less, the greater the dilution and that the effect of the sterilizing agent is less, the more the inorganic salts contained in the food are diluted. For instance, while the constituents of milk or fruit juices can be diluted with water, the organisms suspended therein and which it is desired to kill do not have their contents diluted, but remain in the same physical and chemical condition as before dilution, with a water content of about 75%. As above indicated, this may be due to the fact that the cells of such organisms are substantially impenetrable by any excess of water. Commercial practice has demonstrated that milk condensed to about 75% water is partially decomposed by heat as fast as the protoplasm of the bacteria. It therefore follows that if the product is sterilized after condensation as is now the universal practice, the food constituents will become coagulated and the product will have a cooked taste. On the other hand, if the milk is first diluted to say approximately 10% to 15% total solids and then sterilized, the deleterious effect of the heat upon the food constituents is eliminated, while the spores more readily succumb or die under the application of the heat. As above pointed out my experiments indicate to me that when the milk is so diluted, the bacteria are killed by heating the product for about one-half the length of time that would be required if the milk were condensed to about 25% total solids.

2. Other conditions being constant, the rate of destruction of the bacteria varies directly as the amount of acid effective at the sterilization temperature used but not as the percent of acid or the hydrogen ion concentration which may be present at ordinary temperatures. This might be more precisely and exactly expressed as follows:

The rate of destruction of protoplasm varies as the hydrogen ion concentration maintained during the period of sterilization. It will, therefore, be apparent that the rate of destruction is governed by a more complicated set of factors than has heretofore been suspected.

3. It is further the opinion of the inventor that the destruction of bacteria is materially lessened by the presence of emulsified fat in the solution. Otherwise stated, it may be said that the death point of the bacteria increases in proportion to the percent of fat present when the product is sterilized in a sealed container.

4. It is further the opinion of the inventor that the destructive effect of heat on food is due to a large extent to the catalytic influence of the inorganic salts present. Other conditions being equal, the rate of destruction of food compounds varies as the square or as the $$\frac{5}{2}$$

power of the concentration of solids. Dilution of the material before heating lessens the objectionable effects of heat inversely as the square or the $$\frac{5}{2}$$

power of the concentration. In the case of milk, the destructive effect of the heat on the milk constituents varies as the $$\frac{5}{2}$$

power of the concentration at all concentrations up to 21% total solids. Above 21% total solids, the destructive effect of the heat follows uniformly the square of the concentration.

5. My experiments indicate that at a low temperature, for example, 220° F., average milk will coagulate before the bacteria are killed, at 250° F. the bacteria will be killed before the milk coagulates. In explanation of this apparently paradoxical statement, it may be said that if a series of death point measurements are made, using the same species of resistant bacteria throughout, and the time required for destruction is determined at each of a series of temperatures at suitable intervals, for example of 2° F., and these death points plotted as a curve in terms of time and temperature, and if a similar series of time temperature measurements be made, showing a certain extent of chemical reaction in the medium, milk for example, the curves are found to be similar, but not parallel. Using average evaporated milk of 25% total solids, the death point curve follows a series of time intervals slightly shorter than the time intervals corresponding to the coagulation of the milk, and the two curves cross each other. It is invariably true that destruction of bacteria or animate matter takes place relatively faster at high temperatures than at low temperatures.

6. Some authorities maintain that many animate cells contain approximately 25% total solids and 75% water, or about the same composition as evaporated milk, and thus it is my opinion that the destruction of the spores in evaporated milk, under present methods is accompanied by approximately the same decomposition of the milk. Also the percentage of water inside the living cell remains the same regardless of the extent of dilution of the medium in which the cell is suspended.

7. Investigation and research have also revealed to me certain important and heretofore unknown facts relative to the different kinds of resistant bacteria, their habitat, distribution, and numbers relative to other species of bacteria. In the course of development of the present invention, all species of resistant bacteria which have been known to cause food spoilage have been isolated, fully described, and their death points, habitat and manner of growth determined. They have been gathered from a large area throughout the United States. Several are entirely new, but the total number of distinct species now known as capable of seriously interfering with the sterilization of foods is only 15. While it is recognized as probable that additional species will be found, the fact that a careful search over a period of several years has revealed only a few species of highly resistant bacteria is indicative of the fact that bacteria of this type are comparatively rare. At present, these peculiarly resistant organisms appear to have their natural habitat in the alimentary tracts of animals and in virgin soil. I have never been able to recover any of them from quiet air. Most disinfectants are useless against them. Thus for example, the heat resistant *putrificus* withstands a solution of sodium hypochlorite containing 3% chlorine for a period of five minutes. The same treatment will destroy wood, cellulose and all animate matter except such resistant bacteria. Fortunately, however, the proportion of all resistant bacteria to non-resistant bacteria is small, there being in hay dust, soil, etc. approximately one billion non-resistant bacteria to each one of the highly resistant species.

8. A slightly acid food, such as milk, when sealed in a glass jar, tin can or similar container, will become sterile after heating under pressure of a temperature of 240° F. for a period of 12 to 20 minutes. If a certain strain of *Bacillus putrificus* is present 30 minutes or more will be required, or 26 minutes at 240° F. will be necessary to sterilize the product. But by way of example, if a portion of this same milk be placed in a tin lined vessel filled only one-half or two-thirds full, and is heated to 240° F. by means of a steam nozzle placed in the milk near the bottom of the vessel, and if, during the heating, the steam is allowed to escape abundantly through a valve in the top of the vessel, the milk will become sterile inside of two minutes, or if the most resistant *putrificus* is present, in six minutes. In other words, the destruction of the same bacteria in the same milk takes place about ten times as fast under the conditions last referred to as under any other conditions obtaining in prior art practice.

Thus, it is my opinion that in carrying out the present process, the construction of the apparatus employed and the materials thereof is an essential consideration. This is particularly true with respect to the sterilizing vessel last referred to and which will be hereinafter designated as a high temperature forewarmer.

Of the above stated theories relating to the sterilization of liquid foods, the last two are probably of the greatest importance, particularly in connection with the sterilization of milk products. In addition to the explanation above offered with respect to my above-mentioned theories regarding the advantageous effect of dilution of the product for the purpose of bringing about a more rapid destruction of the resistant bacteria, such greatly accelerated bacterial destruction which takes place in the high temperature forewarmer is also, in my opinion, largely to be accounted for by the manner of application of the heat.

In the practice of my process, I place the material at normal temperature in a container and subject it to the action of high velocity steam jets distributed throughout the bottom portion of the material. By this treatment, which will be described in detail hereinafter I obtain a sterile product which has substantially no evidence of any harmful effects from heat, such as a cooked taste or the like. It is my opinion that the resulting agitation and ebullition caused by such treatment causes substantially all particles of the material to be brought into position for direct contact with one or more particles of steam within a very short period of time, for example, within a period of time but little longer than that required to raise the temperature of the material to a sterilizing point. Further, it is my opinion that by allowing the steam to flow through the material and to escape therefrom into the atmosphere with such freedom that the pressure within the chamber does not materially impair the velocity of the incoming jets, a large volume of steam may be passed through the material per minute, and the material may thus be not only raised in temperature at a rate beyond the adaptive power of the organisms contained therein, but such organisms may be subjected to violent impacts of steam particles and other particles in violent agitation, which not only tend to rupture them by the force of the impacts, but also tend to compass them with resulting reactionary explosive or rupturing effects intensified by reactive expansion, including that due to heat of compression and heat absorption. Undoubtedly, the steam particles also tend to sear and weaken the cell walls, and simultaneously the impacts of the steam particles, and those due to agitation and the collapse of steam bubbles, are all effective agencies, in rupturing and destroying the cells of organisms, including spores.

It is well known that steam escaping through an ordinary nozzle, under a pressure more than 58% in excess of the resistance of the material into which the steam is discharged, will have a velocity of about 1400 feet per second. I therefore deliver steam into the material under a pressure at the nozzle of preferably 50 pounds per square inch (gage), and allow the steam to escape with sufficient restriction to maintain the temperature within the vessel that may be required for the material under treatment. For ordinary milk this temperature is about 230° F. to 240° F. or equivalent to 6 lbs. pressure above that of the atmosphere. By allowing development of such pressure above that of the atmosphere to exist above the material during the initial stages of the process, a steam velocity may be obtained at the points of contact between the same and the particles of material which will approach the above mentioned velocity with consequent impactive effects and resulting agitation and the additional impacts, due to collapsing steam bubbles, as above described. This enables me to sterilize, to the desired extent, milk and other food products within a much shorter time than has heretofore been thought possible, and the process may be completed even to the point of complete sterilization, before flavor changing and chemical reactions have taken place to such an extent as to materially impair the flavor and food value of the material. I have also found, by experiment, that by this treatment the globulin of milk may be destroyed, the albumen redispersed in a new form, stable against coagulation, and that the casein may also be stabilized.

It is very important to the success of my improved process that the material be cooled as soon as the steam treatment has accomplished the desired degree of sterilization. The reduction in temperature should be as rapid as possible, in order to arrest thermal change, particularly flavor change and chemical change. In the description of the apparatus hereinafter set forth, it is explained that rapid cooling may be obtained by evaporation, such evaporation being promoted by connecting the upper portion of the container to a vacuum chamber. While this method of cooling material after sterilization is not novel per se, I believe it to be novel to thus avoid the ordinary effects resulting from prolonged exposure to high temperature by so greatly shortening the periods of rising temperature and of maximum temperature, in that I am thereby enabled to subject the material to a treatment by which it becomes sterile by contact with steam moving through the mass at high velocity, and whereby the material becomes substantially sterile in such a short time that if the material is promptly cooled, the interval during which heat is applied is too short to allow for material thermal deterioration.

The high temperature forewarmer in which sterilization takes place, should be made of tin, or lined with tin or non-copper alloy. If the vessel is made of copper, the same destruction of bacteria takes place but the milk is damaged at an equal rate so that no advantage from the process would be obtained. But satisfactory results may be obtained in a copper vessel if it is provided with an internal lining of sheet tin. Aluminum also exerts a protective action on the milk constituents similar to that of tin and could be used successfully. Likewise silver and nickel have been found satisfactory. Zinc, however, is similar to copper in its action and is distinctly injurious.

Also if, after leaving the forewarmer, the milk is transferred to a copper vacuum pan to be condensed, its temperature must be reduced below a certain limit, and the condensation must be very rapid or the amount of milk handled per unit of copper surface should be very large. Copper condensing apparatus is not well suited for use in connection with my process and failure would be likely to result from it although I have used it successfully.

The protective action of tin and certain other metals on the milk constituents also cannot be explained by any previously known laws. One explanation of the protective action of these metals is that these metals act as a catalyst in retarding the thermal decomposition of milk under certain conditions. Utilizing the above stated facts to the best advantage, it will be readily seen that instead of the usual parallel action of heat on bacteria and on the food components the destruction of the bacteria may be greatly accelerated, and, by the use of tin or other protective metal, dilution and correct control of acidity, the effect on the inanimate components may be further minimized by a large factor so that no appreciable change in color, composition or taste occurs.

As a practical illustration, I have found in factory practice that whole milk may be sterilized by my improved process, canned and again heated to kill the accidental infection of canning, and the resulting product will have approximately the same flavor as milk pasteurized by common commercial processes. In other words, there is no noticeable change in flavor although the milk is heated to a temperature above 240° F. On the other hand, it is well known that milk sterilized in the can, and heated sufficiently to kill the pores has a darkened color and a cooked taste.

The principles above discussed are capable of industrial application with highly advantageous results, particularly in connection with present known commercial milk products which may be enumerated as follows.

1. Sterilized whole milk, of density the same as normal cow's milk and having a pasteurized fresh milk flavor.

2. Sterilized evaporated milk having, when diluted to fresh milk consistency, a flavor practically unchanged from that of pasteurized fresh milk.

3. Sterilized milk powder.

4. Sterilized sweetened condensed milk having less sugar than the present commercial unsterilized product, or specifically, less than 36% of cane sugar.

In carrying out my new process, I use certain apparatus, a typical example of which is illustrated in the accompanying drawings in which, Figure 1 is a diagrammatic perspective view illustrating the high temperature forwarmer, the vacuum pan and the connections therebetween; and Figure 2 is a similar view illustrating the other parts of the apparatus between the vacuum pan and the filling and sealing machine.

In these drawings, the forewarmer 5 consists of a vessel about 500 gallons in capacity, which is essentially a covered tank of copper or other suitable metal having an internal lining 6, preferably of tin. However, linings of aluminum, silver or nickel are also suitable. This tank is of such construction that it is capable of withstanding an internal pressure of over 15 pounds per square inch. The cover of the forewarmer is provided with a manhole 7, a pressure gauge 8, a safety valve 9, and one or more sight glasses 10. A steam inlet pipe 11 extends centrally through the forewarmer cover and at its lower end is provided with a steam nozzle 12 located adjacent to the bottom of the forewarmer. As herein shown, this nozzle is in the form of a plurality of radially disposed tubular arms each having a series of spaced orifices in its wall of proper diameter. The steam inlet pipe 11 is equipped with a suitable gauge 13 which accurately indicates the pressure in the nozzle 12.

The forewarmer is provided with two discharge pipes of relatively large diameter. The pipe 14 is connected to the top of the forewarmer and is provided with a valve 15 while the pipe 16 communicates with the interior of the forewarmer adjacent the bottom thereof and is provided with a valve 17. These pipes are coupled together by the member 18 and connected with a pipe 19 discharging into the evaporator 20 through the medium of the valve 21. The forewarmer 5 is also provided with a blow-off valve 22 and with a suitable thermometer 23.

The second unit of the apparatus consists of the vacuum pan 20 and the discharge tank 24, together with the equipment for handling the product until canned and sealed. The vacuum pan 20 may be of any standard form as now used in condensing processes, but I prefer to provide this vacuum pan as well as a forewarmer with the internal lining of tin. A tin lined vacuum pan is usually preferable in the manufacture of sterilized whole milk, though not required for manufacture of certain other products by the present process. In the latter instance the ordinary copper vacuum pan as at present well known in the condensed milk industry, is entirely satisfactory.

The discharge tank 24 is also similar to those now used in the manufacture of condensed milk, except that this tank is covered and perfectly air-tight. Into the tank 24 the milk is discharged from the vacuum pan 20 through the pipe 25. The top of the tank 24 is provided with a manhole 26 having an air-tight cover and in the preferred form of apparatus, a sterilizing air filter 27 is connected to the top of said tank, the air supply pipe having a valve 28 therein. The pipe 29 communicating with the top of the tank 24 leads to a suitable gas holder and has a valve 30 therein.

A homogenizer 31 of any suitable type is connected with the bottom of tank 24, the pipe connection 32 being provided with a suitable valve 33. The outlet of the homogenizer 31 is connected to the cooler 34 which discharges into a storage tank 35. The cooler employed in connection with my process must be of the type known as an internal cooler, wherein the milk flows through a series of cooling coils. These coils are ordinarily constructed of thin walled copper tubing which is internally nickel plated or tin plated. The cooling medium such as water or brine, flows over the outside surface of the tubes. However, any type of cooler which will cool the milk effectively, while preventing contact of air with the milk, would be suitable.

The storage tank 35 may be glass lined or may be constructed of tin plated copper, these being the preferred materials. This tank must be air-tight and the cover thereof is provided with a suitable manhole 36. From the top of said tank a valved outlet pipe 37 leads to a gas holder (not shown). The top of this tank is also connected to an air filter 38, the pipe connection being provided with the valve 39. Through valve 40, said tank may be connected with a high vacuum pump. This tank discharges its contents into a filling machine 41 which may be of any one of several well known forms, but preferably, I use the type known as the Dickerson vent hole filler. This machine simply fills the cans but does not seal them, the filled cans being passed from said machine to a sealing machine conventionally indicated at 42.

I also provide within the lower end of the storage tank 35, a suitable mechanical agitator 43.

In the canning of any milk product made according to my process, it is very desirable to displace the oxygen more completely than has heretofore been done.

Having thus fully stated many considerations involved in the production of products of the character with which my new process is more particularly concerned, I shall now describe the practical application of the new process with particular regard to the production of sterilized whole milk.

The forewarmer 5 being of 500 gallons capacity and preferably tin lined as above described, from two hundred to three hundred gallons of fresh milk are admitted thereto and treated in one operation. After the forewarmer is closed, steam is admitted thereto through the inlet pipe 11 and nozzle 12 and during the period of heating the contents of the forewarmer, the blow-off valve 22 at the top thereof is left open. For a forewarmer of 500 gallons capacity, this outlet should be not less than approximately .4 square inches in area. The valve 22 remans open during the forewarming of the milk and serves as a means of escape for the air in and above the milk and later, for the escape of the steam which must be allowed to flow through and escape from the body of the milk. But first, the steam escaping from the jet orifices of the nozzle 12 condenses in the body of milk and dilutes the same, such dilution continuing until the milk reaches a temperature of approximately 240° F. at which time the solution contains from 10 to 15% total solids. When the solution attains the required temperature as shown by the thermometer 23, the steam inlet 11 is partially closed so that the rate and volume of the continuing admission of steam is only such as to maintain the maximum temperature of the contents of the forewarmer for about three minutes under the conditions stated. The contents should be maintained at this temperature for preferably not less than two minutes for the volume stated. Such temperature might be maintained for more than three minutes without injury to the milk but in practice I prefer to treat the milk at this temperature for approximately three minutes. I use the term "approximately" for the reason that the degree of temperature and the time of exposure to the high temperature are both dependent upon the volume of milk treated or the proportions of depth to volume and the number and distribution of steam jets and the kind of bacteria present in the milk. In some cases, I have sterilized milk by my improved process without raising its temperature above 225° F., but if highly resistant bacteria are present, a higher temperature is needed. At the end of this time the steam inlet 11 is completely closed and the blow-off valve 22 is likewise closed. The valve 15 in pipe 14 is now opened so that the steam in the forewarmer is discharged therefrom into the vacuum pan. This discharge pipe must be of comparatively large size so that pressure above the body of milk in the forewarmer will be reduced to normal atmospheric pressure within about three minutes. During this three minutes while the milk is blowing down in pressure it boils vigorously and thereby cools itself to the normal boiling point. Considerable milk may splash or foam into the vacuum pan through pipe 14 during this part of the operation. The vacuum pan 20 should be started in operation a few minutes before the forewarmer is ready to blow down so that the vacuum pan will be under vacuum at the time the steam is discharged into it from the forewarmer. As soon as the pressure in the forewarmer has been reduced to atmospheric or approximately so, the steam outlet valve 15 is closed and the valve 17 in pipe 16 extending to the bottom of the forewarmer is open. The vacuum pan then draws the balance of the milk from the bottom of the forewarmer 10 and as it enters the vacuum pan, which should maintain a vacuum of approximately 27" of mercury, the milk is cooled, due to the vacuum, until it reaches a temperature of about 125° F. A large part of the water due to the condensation of steam in the initial portion of the forewarming step is evaporated at this point. The heating coils of the vacuum pan are supplied with a heating medium and heated to such temperature as to complete condensation of the milk solution to its normal density or to a specific gravity of approximately 1.035 at 60 degrees. Ordinarily, condensation to this point requires only a few minutes since the process of drawing down in the forewarmer has already caused considerable of the excess water to evaporate.

After the milk has thus been condensed to the proper consistency in the vacuum pan, any one of five possible modifications may be employed in the transfer of the milk from the vacuum pan to the storage tank 35. It will be understood that the milk as it leaves the forewarmer is entirely sterile and free of air. If the vacuum pan and the apparatus between said pan and the storage tank has first been sterilized by steam under pressure, the milk in the vacuum pan will also be both sterile and air free. The milk may, therefore, be delivered in this condition to the machine 41 and filled into the cans without contamination. It is important that the milk shall be free of air when it is sealed in the can. I have found it to be entirely practical either to saturate the milk with nitrogen as it leaves the vacuum pan and maintain it free from oxygen throughout the further steps of the process, or it may be saturated with the nitrogen and not maintained entirely out of contact with air, or it may be conducted in contact with the air as far as the filling machine and the air then removed from the can before sealing. Thus five modifications of this part of the process are possible as follows:

1. The milk may be carried through the vacuum pan and the filling machine both sterile and free of air.

2. The milk may be maintained free of air but not sterile insofar as air borne bacteria are concerned.

3. It may be maintained free of bacteria but in partial contact with air.

4. It may be maintained in contact with air and in contact with air-borne bacteria.

5. It may be maintained free of air-borne bacteria but in contact with air until ready for canning at which time it is free of air and saturated with nitrogen.

It will, therefore, be understood that the product may be kept sterile to the degree necessary to accomplish the desired purpose. If it is to be consumed within a few days or a week, the same care in excluding all spores and organisms is not required, as in cases where more permanent keeping qualities are desired.

Assuming that the first modification is to be followed, the entire apparatus is first sterilized under steam pressure before admitting any of the milk thereto. The milk is then heated and sterilized in the forewarmer and concentrated in the vacuum pan. The discharge tank which receives the milk from the vacuum pan is prepared by first displacing all of the air within said tank with nitrogen. The valve 28 connecting air filter 27 with the discharge tank is then closed and communication is opened through a pipe connection between the vacuum pan and the discharge tank by the valve 28' whereby the pressures therein are equalized. The valve in the pipe connection 25 between the bottom of the vacuum pan and the discharge tank 24 is then opened so that the milk will flow from the vacuum pan into the tank. This valve and the valve 28' are then closed and valve 28 is opened so that nitrogen gas is admitted to the discharge tank through the filter 27 until the pressure in said tank is restored to atmospheric. The homogenizer 31 is then started and valve 33 opened, the milk being homogenized at a pressure of approximately 3000 lbs. per square inch. It is generally necessary to homogenize the milk twice so that two homogenizers arranged in series are required, or the milk must be passed from the homogenizer back to a second discharge tank from which it is again drawn and passed through the homogenizer before passing through the cooler. The cooler 34 and the storage tank 35 are first prepared to receive the milk by being filled with nitrogen gas. The milk passing through the cooler displaces the nitrogen therein and flows into the discharge tank, displacing the nitrogen from the latter and causing the excess nitrogen to pass out through the valve 37 to a suitable gas holder.

If the second modification above referred to is employed, the apparatus from the vacuum pan to the storage tank need not necessarily be free of air-borne bacteria, but suitable precautions must be taken to exclude the highly resistant bacteria. The initial sterilization of the milk by steam under pressure in the forewarmer is a positive assurance against the presence of such resistant bacteria. In this particular modification, the product is given a higher sterilization in the can and consequently, contamination with vegetative bacteria will do no harm. Otherwise, the process is conducted the same as above described.

In using the third modification referred to, the apparatus is first sterilized by steam under pressure, but instead of the discharge tank and storage tank being connected to nitrogen gas holders, they are connected to the atmosphere through the sterilizing filters 27 and 28 respectively, which permits the air to flow in either direction as the milk flows in or out of the tank. These filters remove all air-borne bacteria. Thus bacterial contamination of all kinds will be obviated though the milk is allowed to come into contact with air. The product when handled in this manner must be subjected to a vacuum after filling and before sealing for a length of time as may be required to completely remove the dissolved air.

In using the fourth modification, covered tanks are not essential and the product is allowed to come into free contact with the air and consequently with air-borne bacteria. This product must be freed of dissolved air before sealing in the can and must then be given a higher sterilization treatment in the can to destroy the air-borne bacteria. In this case, wherein the milk is allowed to come into free contact with air-borne bacteria, it might be thought that in thus becoming infected, the value of the previous sterilization in the forewarmer would be lost and the usual sterilization treatment in the can then required. But this is not the case, since, as heretofore explained, the resistant bacteria having a death point temperature of 240° F. are relatively rare. They come primarily from the alimentary tracts of animals, which is their normal habitat. Nearly all food materials are heavily contaminated with them. But I have never found them in quiet air, or in materials kept free from contamination with the excrete of animals. The common abundant spore-forming bacteria such as *B. subtilis*, are all killed by a temperature of 230° F. for ten minutes.

In employing any of the processes herein described, where air contact with the product occurs, it should be understood that the operations are carried out in modern sanitary equipment and in a clean factory. In actual practice I have exposed pre-sterilized milk to the air for several days at a time without infection by resistant bacteria, and infection by *B. subtilis* is rare. Average clean market milk contains from 1,000,000 to 10,000,000 resistant bacteria per gram, or in excess of a million per quart. These organisms are not detected by ordinary culturing methods. After they are destroyed no practical difficulty is experienced in avoiding re-infection by them. Whether the milk is handled sterile or not, a heat treatment in the can is generally given for the purpose of stabilizing the milk against fat separation.

Another step which may be employed in connection with this process but which is not essential, though desirable in producing a product of the highest quality, is the standardizing of acidity in the product. In order to prevent fat separation or churning in a whole milk product, which is to be transported over long distances, the fat should be coated with absorbed casein. Even homogenizing will not prevent, in all cases, churning or separation of the fat, but homogenizing, together with a slight protein entanglement, will effectively prevent separation or churning. I have found that if the acidity of the milk at the time it is canned is increased slightly to such a point, for example, to .17% total apparent lactic acidity, then by pasteurization in the can, considerable casein will be adsorbed on the surfaces of the fat globules and thus prevent their separation or churning.

The dilution of the milk in the forewarmer during sterilization is an important feature of my process as I have found that the fat exerts a distinct protective action on the bacteria and the spores. In other words, the degree of heat penetration of such animate matter decreases in inverse ratio to the total proportion of fat constituents in the solution. Thus an increase of 1% of the fat in milk has been found to increase the resistance of the bacteria to heat so that under similar conditions, fully 5° F. higher temperature was required for sterilization. Therefore, it is evident that the less the relative proportion of the milk solids and particularly fat, the more easily may the resistant bacteria and spores be destroyed and at a lower temperature. It follows, therefore, that by the dilution of the milk solution, either partially or wholly in the forewarmer, or before it is placed therein, to a total solid content of from 10 to 15% as distinguished from the normal 25 or 26%, the fat protective action will be neutralized.

After the milk has been treated as above described and diluted to the desired specific gravity or total solids content, a sample of the milk is then canned and treated in a sterilizer at a selected temperature, say for example, 230° F., for a period of ten minutes, the sample being rotated as in the usual process of sterilizing evaporated milk. Ordinarily the milk will undergo no change in this process. If it shows no change or tendency to coagulate in this sterilizing treatment, a series of samples are filled into the cans and treated with varying proportions of lactic acid so as to increase the acidity of the milk from that which it usually contains or about 0.15% apparent lactic acid to a series of higher percentages such as .16, .165 and .170. This series of samples carrying such increased acidity is heated together for a period of ten minutes at a temperature usually about 230° F. The purpose of this test is to ascertain the correct amount of lactic acid to add to the milk which will cause, during the milk sterilization in the can, an adsorption of casein on the fat globules. With the proper combination of acidity and heat treatment, a partial precipitation of casein on the fat takes place. Such precipitation of the casein is in part brought about by the greatly reduced size of the fat globules, due to homogenizing and in part by the fact of the increased acidity and the temperature employed. This adsorption of casein on the fat prevents churning or separation of the fat in the finished product. The amount of excess acid employed is so small that the flavor of the product is not affected thereby and it does not cause the total acid content to exceed that which is frequently found in normal fresh milk. The acid, however, must be standardized to a certain point. When the proper quantity of acid is found by the test and microscopic examination of the sterilized samples shows that the desired colloidal adsorption has taken place, then the calculated quantity of diluted lactic acid is added to the entire batch of milk and the milk is then canned.

During the canning of the milk it absorbs a slight amount of air although it is exposed to the air for only a few seconds. The empty cans are also filled with air which must be displaced from above the milk. The filled cans are preferably sealed in a nitrogen atmosphere. After such sealing, the filled cans are placed in a sterilizer of suitable form, such as now used for sterilizing milk and are given a heat treatment for say ten minutes at 230° F., which serves to destroy any accidental bacterial contamination and to bring about the colloidal adsorption which prevents separation or churning of the fat. This final sterilizing treatment is not sufficient to affect the flavor of the milk when it is in an atmosphere of nitrogen. I find that this sterilizing treatment does not even affect the flavor of the milk to the extent obtaining in the ordinary pasteurizing process, provided the milk is in an atmosphere of nitrogen and but little oxygen and no deleterious metal, such as copper is present.

The completely sterilized milk may be kept in storage for any length of time required, since it is sterile. Also, several days' milk may be mixed together for standardizing and canning at one time, if sufficient storage space is available. Refrigeration is not necessary, but storage at a temperature of 50 to 60° F. is preferable.

When the milk is to be canned for prolonged storage all of the ordinary precautions for exclusion of air and for guarding against reinfection may be employed.

The sterilizing step in the high temperature forewarmer is of first importance, and unless this step of the process is carried out substantially as herein referred to, complete success may not be attained. In particular, the requirement that the milk composition must be subjected to the action of the steam jets in the presence of a neutral metal such as tin, aluminum, silver or nickel should be strictly observed. Copper cannot be successfully used and glass is much less suitable. However, it is possible that other metals of various kinds may be found which will subserve the purpose, but my present knowledge indicates that a lining of tin for the high temperature forewarmer will give the best and most uniformly satisfactory results.

If the final sterilizing low temperature treatment of the product in the can is to be omitted, the entire apparatus from the vacuum pan to the filling machine, should be previously sterilized by steam under pressure. This is an entirely practical procedure and has been employed successfully. Also, the storage tank, vacuum pan and discharge tank should be connected either to a source of sterile nitrogen or should be connected to the gas holders through bacterial filters so as to completely exclude any possibility of accidental bacterial contamination. I have shown and described a filter suitable for this purpose in my pending application, Ser. No. 437,704, filed January 17, 1921. In addition to this application, reference may also be made to a second copending application, Ser. No. 440,819, filed January 21, 1921, and Patents Nos. 1,435,464, and 1,461,653, issued November 14, 1922 and July 10, 1923, respectively, from a perusal of which the several novel features of my improved sterilizing process as now finally developed and used in the production of such food products on a commercial scale may be more readily understood.

The product when made in accordance with my process as last described, is more nearly free of oxygen than a product of a similar nature, heretofore known in this art. Further, emulsions, such for example, as those described in the above-mentioned Patent No. 1,435,464, made in accordance with this process, are further stabilized in that they are made sterile. Thus not only may products be obtained which are free from oxygen and which are stabilized against coagulation and coalescence (see my above-identified Patent No. 1,435,464), but also the product is further stabilized in that the protective colloidal coating of protein on the fat particles, and the fat particles themselves are sterilized.

Sterilized whole milk made according to any one of the above described modifications of my improved process may be distinguished from products made by numerous processes heretofore available, in that the milk manufactured by my process has immediately after manufacture, a flavor which is more nearly like pasteurized fresh milk than can be obtained in a product directly sterilized in the can. In fact the color of the improved product made by my present process is ordinarily indistinguishable from the color of fresh milk, whereas milk sterilized in the can in the usual manner, is in comparison, of a pronounced darker color and shade. The characteristics distinguishing a product prepared in accordance with my process from the analogous prior art product, is even more marked when the products are about six months old.

The high temperature forewarmer process of my present invention may be applied to the manufacture of evaporated milk having little or no cooked taste and having little or no tendency to age in the can. The apparatus is similar to that previously referred to and used in the method of sterilizing whole milk. The forewarmer apparatus is identical with that described for the manufacture of sterile whole milk. While it is possible to use a standard vacuum pan in the making of whole milk on account of the very short condensing period required, such apparatus cannot be successfully employed in the manufacture of sterile evaporated milk by my process. On account of the longer time required to condense the milk to the required consistency of evaporated milk, a copper vacuum pan cannot be successfully employed. The prolonged contact with copper in the vacuum pan would nullify the advantages secured by the use of the high temperature forewarmer and render the milk darker in color, objectionable in flavor and easily coagulable. Preferably, all equipment used should be constructed of or lined with tin or other similar metal. Aside from these very necessary precautions, the process and apparatus for the manufacture of evaporated milk by my high temperature forewarmer proces is identical with the process and apparatus used in the manufacture of sterile whole milk. This product is condensed to the desired consistency usually about 1.07 specific gravity, whereas the whole milk is condensed to specific gravity of about 1.035. Evaporated milk made in accordance with my present process may be distinguished from evaporated milk made by the old prior art methods in the following particulars.

At the time of manufacture my product will be found lighter in color than commercial brands of evaporated milk now upon the market and it will also be found to be practically identical in color with the color of unsterilized milk of the same density. On the other hand, milk of the same density sterilized by methods or processes now in general use will be found to have undergone a distinct darkening in color as contrasted with unsterilized milk of the same density, if the product has in fact been so treated that it is actually rendered sterile.

The differences in flavor between my product and the present commercial brands of evaporated milk are quite distinct and unmistakable. A product made under my process herein described when tested without dilution, is found to entirely lack the cooked flavor of the ordinary evaporated milk.

More definitely, my product may be distinguished from ordinary evaporated milk by placing a can of each of these products of equal age in an incubator at 98° F. for a period of one month. This would be equivalent to storage of the products for one month in a warm climate without refrigeration. At the end of the month, the ordinary evaporated milk will be found much darker in color, having taken on a brownish tint and also having acquired a characteristic aged taste. My product, however, will be found to have undergone little or no change in color from that which it originally possessed and also will be found to have retained, without noticeable change, its original distinct flavor of fresh pasteurized milk. If these same two samples be diluted to fresh milk consistency, my product will be found still suitable for drinking, being entirely lacking in the burnt or aged flavor of the ordinary evaporated milk. The latter will not only have its original cooked taste, but a peculiar additional flavor which is characteristic of this prior art product when it is stored in a warm climate. Therefore, it is to be noted that the differences both in color and in flavor between my product and ordinary evaporated milk at the time of manufacture and after storage for a definite period, is an infallible means for distinguishing the one product from the other. If my new product was to be made without sufficient elimination of the oxygen, it would, after storage in a warm place for one month, be found to have darkened slightly in color and to have a flavor which is different from that of ordinary evaporated milk, and, therefore, distinctive for this new product when canned in the presence of oxygen, since it still lacks the burnt or cooked flavor of commercial evaporated milk as prepared in accordance with known methods or processes.

My improved process may also be applied to the manufacture of sweetened condensed milk of a quality somewhat different from that heretofore manufactured. One particular advantage which the process possesses in the manufacture of this product is that it enables the product to be produced with a lower sugar content than the customary 40 to 44%, and which at the same time, will be sterile and free from all contaminating organisms. This sweetened milk may also be made of less density than the usual product if desired, and this, together with the lessened percentage of sugar practically precludes the danger of lactose crystallization which is a common defect of commercial condensed milk as now manufactured. In the manufacture of this particular milk product by means of my particular process, the same apparatus as is used for making the evaporated milk is employed.

A further distinction between my product and ordinary sweetened condensed milk is that the product made under my process may contain less tnan 36% cane sugar and yet keep indefinitely, whereas ordinary condensed milk cannot be made to keep if it contains less than 36% cane sugar.

In connection with a powdered milk product, the purpose of my present new process is not essentially to improve the original flavor of the product, but is to improve its keeping qualities.

Powdered milk made in accordance with my process may be distinguished from ordinary powdered milk as follows:

My new product is sterile, or practically so. If this product be made without any special precaution against bacterial contamination from the air during canning, it may contain bacteria, either spore formers or non-spore formers, in very small numbers. Culturing tests will ordinarily be negative, although occasional organisms may be found. This is in marked distinction to ordinary powdered milk which will invariably contain great numbers of spores, frequently about one hundred thousand per gram, and seldom, if ever, below ten thousand per gram. If my product is made with due precautions against air infection, it will invariably be found absolutely sterile.

I have herein more particularly referred to several industrial applications of my new process in connection with the manufacture of milk products. However, it is possible that this new process either in its entirety or in certain steps thereof, might be advantageously applied and used in connection with the treatment of various food materials. It is accordingly to be understood that in many respects the invention herein disclosed is not to be limited in its utility to the precise application of the several steps as above described, and that the privilege is reserved of adopting all such legitimate modifications thereof as may be fairly embodied within the spirit and scope of the appended claims.

It will be understood from the foregoing description that in the practice of my process the milk is raised from a normal or at least a non-pasteurizing temperature to its maximum temperature in a very short period of time, the time interval being in fact just about sufficient to enable all particles of the violently agitating milk to be brought into contact with particles of steam at the high velocity attained by the steam in the nozzles. The steam velocity is substantially constant during the treatment or period of steam injection, inasmuch as the pressure is not allowed to build up within the chamber to a point where it will materially retard the flow of the steam. Steam will flow through an orifice at a speed of approximately 1400 feet per second if the external pressure does not exceed 58% of the pressure at the source of steam supply to the orifice. Therefore, by preventing velocity checking pressure to build up in the milk chamber it is possible to subject all particles of the milk or liquiform food to the direct impact of one or more particles of steam traveling at the above mentioned high velocity, thus subjecting all living tissue cells, including spores, to impact and rapid temperature rise with consequent rupturing effects.

Tests which I have made indicate that the globulin and albumen of the milk are completely changed, and instead of being coagulated as they are during ordinary thermal sterilization, the globulin and albumen are in part adsorbed upon the fat and in part redispersed in a new colloidal form not identified chemically. Upon physiological test no reaction is shown. Whereas in boiled milk coagulation can be readily detected microscopically. The redispersed globulin and albumen is thermally stable against coagulation, it requiring for coagulation a degree of heat far in excess of that which would be required to coagulate these substances in natural milk.

It is very important to reduce the temperature of the material below a point where flavor changing thermal effects will take place as soon as possible after steam has been injected for a sufficient length of time to insure complete sterilization in the manner above described. Therefore, it is highly important upon completion of the steam treatment to instantly reduce the pressure in the chamber as far below atmospheric pressure as possible, thus refrigerating the material by rapid evaporation to a point below that at which cooking or flavor changing effects will take place. I find in practice that I can almost instantly reduce the temperature of milk from in excess of 210° F. to 110° F. by connecting the interior of the chamber to a vacuum chamber through a comparatively large duct as disclosed in the drawings of my application. It will, therefore, be obvious that my process is carried on in such a manner as to reduce the period of exposure of material to cooking temperature to the fullest extent possible to attain with the apparatus shown in my drawings, while at the same time allowing a sufficient period for the exposure of each particle of milk to direct contact with a particle of steam.

I claim:

1. The process of sterilizing liqui-form foods which consists in heating the food material in a closed vessel, and in contact with a neutral protective metal, by liberating a multiplicity of fine steam jets into the material near the bottom of the vessel until the material reaches a predetermined sterilizing temperature while permitting the steam to flow through the material and escape through a vent at the top of the vessel.

2. The process of sterilizing liqui-form foods which consists in heating the food material in a closed vessel to a predetermined sterilizing temperature, and in contact with metallic tin, by liberating a multiplicity of fine steam jets into the food material near the bottom of the vessel, and permitting passage of the steam through the material and its continuous escape through a vent at the top of the vessel.

3. The process of sterilizing liqui-form foods which consists in heating the food material in a tin-lined vessel by the direct admission of steam into the mass of the material, and permitting the free flow of the steam through the material and its continuous escape from the vessel until the material has been heated to a predetermined sterilizing temperature.

4. The process of destroying bacterial organisms in liqui-form food products which consists in liberating into a mass of the material contained in a suitable vessel, a multiplicity of steam jets at a pressure exceeding 25 pounds per square inch to thereby directly heat the material and permitting the steam to freely flow through the material and escape from the top of the vessel until a predetermined sterilizing temperature is reached, and maintaining such sterilizing temperature from one to three minutes.

5. The process of sterilizing milk which consists in heating the milk in a closed vessel by direct admission of steam into the milk in a multiplicity of fine jets until the milk reaches a temperature of approximately 230° F. while permitting the free flow of the steam through the milk and its escape through a vent at the top of the vessel for a period of time sufficient to kill all bacterial spores in the milk.

6. The process of sterilizing liqui-form products in bulk which consists in heating the food material in a closed vessel by the direct admission of high pressure steam jets into the material while permitting the steam to flow through the material and escape from a vent at the top of the vessel until a predetermined sterilizing temperature is reached, and maintaining the material at such temperature for a period of time not exceeding approximately three minutes.

7. The process of producting sterile liqui-form food products without injurious effect upon the flavor thereof including the following steps; first sterilizing the product in a nearly closed vessel by subjecting the same directly to the action of high pressure steam jets to rapidly raise the temperature of the material from a non-pasteurizing temperature to a sterilizing temperature and then connecting the upper portion of said vessel with a point of discharge into a vacuum to reduce the temperature of the material as rapidly as possible below the pasteurizing point by evaporation.

8. The process of destroying bacterial organisms in liqui-form food products which consists in partially confining such material in a suitable vessel, subjecting said material to the direct impact of high velocity steam jets, agitating the material to bring substantially all portions thereof into position for impacting contact of steam therewith and maintaining a sufficient pressure drop between the steam supply at the point of delivery and the pressure within said material to insure a sufficient velocity in the steam jets to rupture living cells by impact of the particles of steam thereon until substantially all of the particles of said material have been subjected to one or more of such impacts.

9. The process of sterilizing liqui-form food products which consists in passing the particles of material successively into the paths of particles of steam moving at high velocity sufficient to rupture living cells and maintaining said velocity by regulating the pressure drop between the source of steam supply and the pressure within said material to sterilize the particles of material by impactive and searing effects of the contacting steam, and a rate of thermal change beyond the power of adaptation of living cellular organisms.

10. The process of sterilizing liqui-form food products which consists in subjecting the material at normal temperatures and within a nearly closed chamber to the direct impact of multiple jets of steam entering the material throughout substantially the entire area of its bottom portion at substantially maximum velocity of steam jets, escaping through ordinary nozzles with a pressure drop in excess of 40%, until substantially all particles of the material have been subjected to the direct impact of particles of steam, and then reducing the temperature of the material as rapidly as possible by evaporation to a point where thermal changes of a chemical or flavor altering character will cease.

11. The process of sterilizing liqui-form products which consists in heating the product in a closed vessel, and in contact with a neutral protective metal, by liberating high velocity steam jets into the product near the bottom of the vessel until the material reaches a predetermined sterilizing temperature while permitting the steam to flow through the material and escape through a vent at the top of the vessel under such regulation as to maintain the sterilizing temperature without unduly impeding the velocity of the steam jets.

12. The process of threating liqui-form products which comprises appying heat and kinetic energy to the product in a closed vessel by liberating high velocity steam jets into the product, and permitting passage of the steam through the material and its continuous escape out of the vessel while regulating the incoming and outgoing steam to maintain a predetermined sterilizing temperature in the vessel without unduly reducing the rate at which heat units are carried into the material.

13. The process of stabilizing liquiform dispersions with a protective colloid susceptible to bacterial action, which comprises simultaneously destroying bacterial organisms and effecting a substantially uniform distribution of the protective agency with respect to the dispersed phase through the sustained action of high velocity steam jets injected into the liquid to raise and maintain it at a sterilizing temperature, said steam jets being of such velocity as to sterilize the liquid in a relatively short period of time and without producing objectionable cook taste.

14. A sterile milk characterized by absence of active spores and substantial absence of cooked taste and flavor change, having its globulin and albumen adsorbed in part upon the fat and in part redispersed in new colloidal form with increased resistance to coagulation and without reaction to physiological test for globulin.

15. The process of stabilizing fatty liquiform products which comprises subjecting the product to the direct action of high velocity steam jets of the kind described to materially dilute the product to lower the fat concentration, and to raise the material to a sterilizing temperature by the action of said steam jets, and continuing said treatment by said steam jets to maintain said sterilizing temperature until said product is substantially sterile, said steam jets being of such high velocity that the product is sterilized in a relatively short period of time and without producing appreciable cook taste then rapidly cooling the product to a temperature below 110° F. by boiling off, and homogenizing said product to stabilize it further.

16. The process for treating and sterilizing liquiform foods which comprises subjecting said material to the action of high velocity steam jets of the kind described while said material is in contact only with non-copper metals and raising the material to a sterilizing temperature as determined under the conditions effected by said steam treatment, and continuing said steam treatment to maintain said sterilizing temperature until said product is made sterile, the nature of said high velocity steam jets being such that the product is sterilized in a relatively short period of time and without producing objectionable cook taste.

17. The process of forming a sterile stable emulsion from two or more liquids, one or more of which is immiscible in the others, and an emulsifying agent, which comprises subjecting a mixture of said constituents to the direct action of high velocity live steam jets of the kind described to disperse said constituents, and to precipitate at least some of the emulsifying agent on at least some of the emulsified material, and to raise said product rapidly to a sterilizing temperature; and maintaining said product at said temperature by said steam jets until it is sterile, said steam jets having such high velocity that the product is made sterile in a relatively short period of time and without producing appreciable cook taste.

18. The process of treating liquiform products containing coagulable material and non-soluble material which consists in the steps of directly injecting jets of steam into the material (said steam jets having that velocity acquired by steam escaping through a friction nozzle in which the back pressure is less than 58% of the pressure on the high pressure side of the nozzle) to raise the material to a sterilizing temperature and to cause the coagulation, re-dispersion and part adsorption of the coagulable material upon the dispersed, non-soluble materials to stabilize the emulsion formed thereby and of continuing the steam jet treatment until the product is substantially sterile.

19. The process of treating a liquiform product which consists in the steps of simultaneously applying sterilizing heat and kinetic energy by subjecting the material to the action of high velocity steam jets of the kind described to raise the material to or above that thermal devitalization point of bacterial organisms as determined by the condition existing during said treatment, of maintaining said temperature and kinetic energy treatment for a time sufficient to devitalize such organisms, and then quickly cooling the product to avoid flavor change, said steam jets being of such high velocity as to produce the devitalization in a relatively short period of time and without producing appreciable cook taste.

20. That step in the process for treating liquiform food products, which comprises subjecting the product to the continuous direct action of high velocity steam jets to raise the material to or above the sterilizing temperature, said steam jets being of such high velocity that by continuing the steam jet treatment to maintain the sterilizing temperature, the product is substantially sterilized in a relatively short period of time and without producing appreciable cook taste.

21. Process for manufacturing sweetened condensed milk containing slightly less than 36% sugar by weight, substantially free from cooked taste and permanently keeping, comprising mixing sugar and natural milk in such proportion that when condensed the product will contain approximately or slightly less than 36% sugar by weight, treating the mixture with high velocity steam jets to raise it to a sterilizing temperature and continuing the steam jet treatment to sterilize the product in two to three minutes, cooling the mixture to a temperature below that favorable to chemical change, and then condensing the product by evaporation to the desired proportions.

GEORGE GRINDROD.

CERTIFICATE OF CORRECTION.

Reissue No. 19,193. June 5, 1934.

GEORGE GRINDROD.

It is hereby certified that error appears in the printed specification of the above numbered patent requiring correction as follows: Page 4, line 113, for "forwarmer" read forewarmer; page 5, line 89, for "remans" read remains; page 7, line 29, for "absorbed" read adsorbed; and page 10, line 112, claim 12, for "threating" read treating; and that the said Letters Patent should be read with these corrections therein that the same may conform to the record of the case in the Patent Office.

Signed and sealed this 9th day of April, A. D. 1935.

Leslie Frazer

Seal) Acting Commissioner of Patents.